United States Patent [19]

Sedlack

[11] Patent Number: 5,082,325

[45] Date of Patent: Jan. 21, 1992

[54] HARNESS ADJUSTMENT MECHANISM

[75] Inventor: Mark Sedlack, Cuyahoga Falls, Ohio

[73] Assignee: Century Products Company, Macedonia, Ohio

[21] Appl. No.: 715,326

[22] Filed: Jun. 14, 1991

Related U.S. Application Data

[63] Continuation of Ser. No. 556,070, Jul. 20, 1990, abandoned.

[51] Int. Cl.$^5$ ............................................. A47D 15/00
[52] U.S. Cl. ...................................... 297/250; 297/468; 297/483; 297/484; 297/485
[58] Field of Search ............... 297/250, 468, 483, 484, 297/485; 280/808

[56] References Cited

U.S. PATENT DOCUMENTS

| | | | |
|---|---|---|---|
| 3,910,634 | 10/1975 | Morris | 297/484 |
| 4,093,307 | 6/1978 | McLennan | 297/485 |
| 4,205,670 | 6/1980 | Owens | 297/468 |
| 4,545,613 | 10/1985 | Martel et al. | 297/250 |
| 4,545,617 | 10/1985 | Drexler et al. | 297/250 |

Primary Examiner—Kenneth J. Dorner
Assistant Examiner—Milton Nelson, Jr.
Attorney, Agent, or Firm—Townsend and Townsend

[57] ABSTRACT

A harness adjustment and fastening mechanism for a child's car seat and method for securing a child's car seat harness. A harness made of a single belt threaded through a buckle detachably fixed to a point on the front, seat portion, of a plastic unitary seat structure. The belt is free to travel through the buckle. The two free ends of the belt pass over the child's shoulders and are threaded through the unitary seat structure to a rear portion of said structure. The belt ends each contain several loops through which a wire rod can be passed. Size of the harness can be altered by varying the loops through which the rod is threaded. The ends of the threaded rod are fitted into grooves located on the back of the unitary seat structure. A snap tab molded into the housing prevents motion of the rod out of the grooves thereby securely fastening the harness.

11 Claims, 3 Drawing Sheets

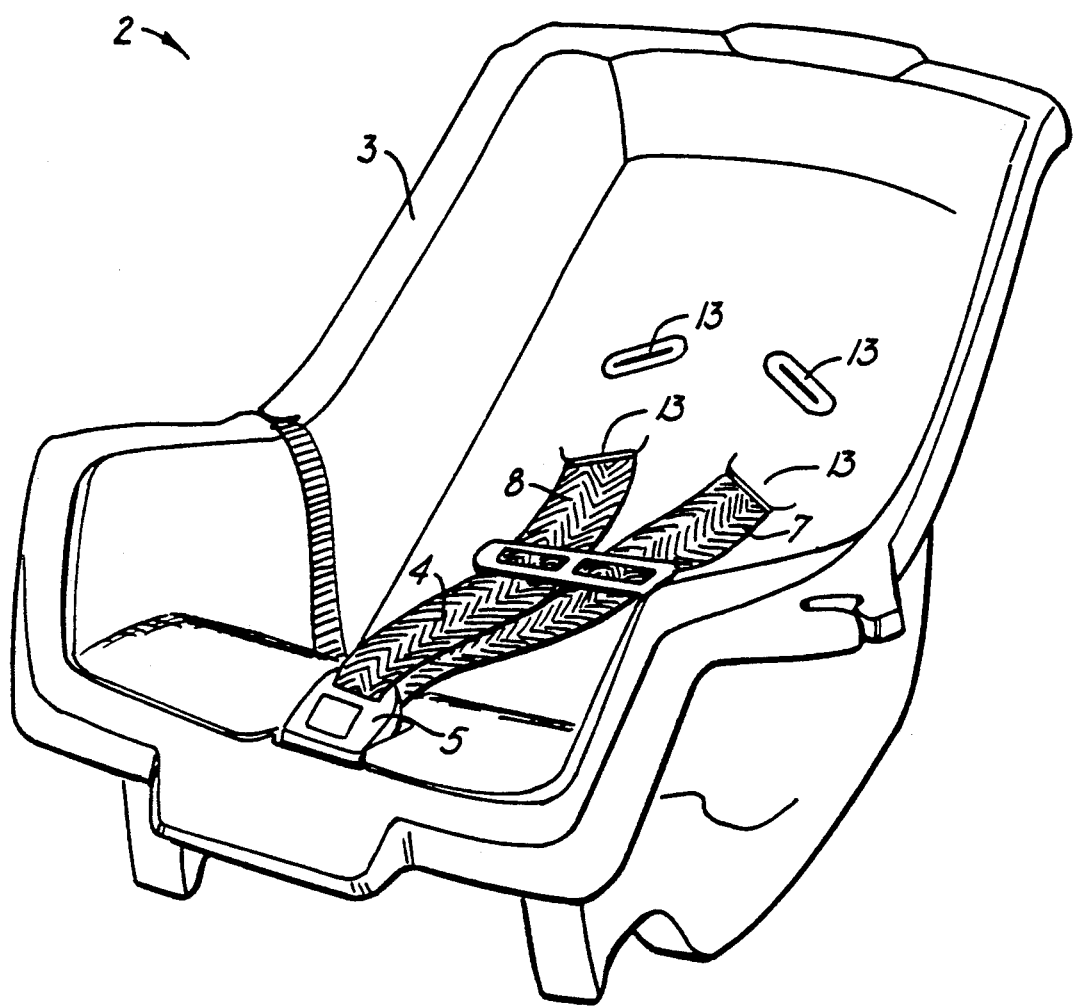
FIG._1.

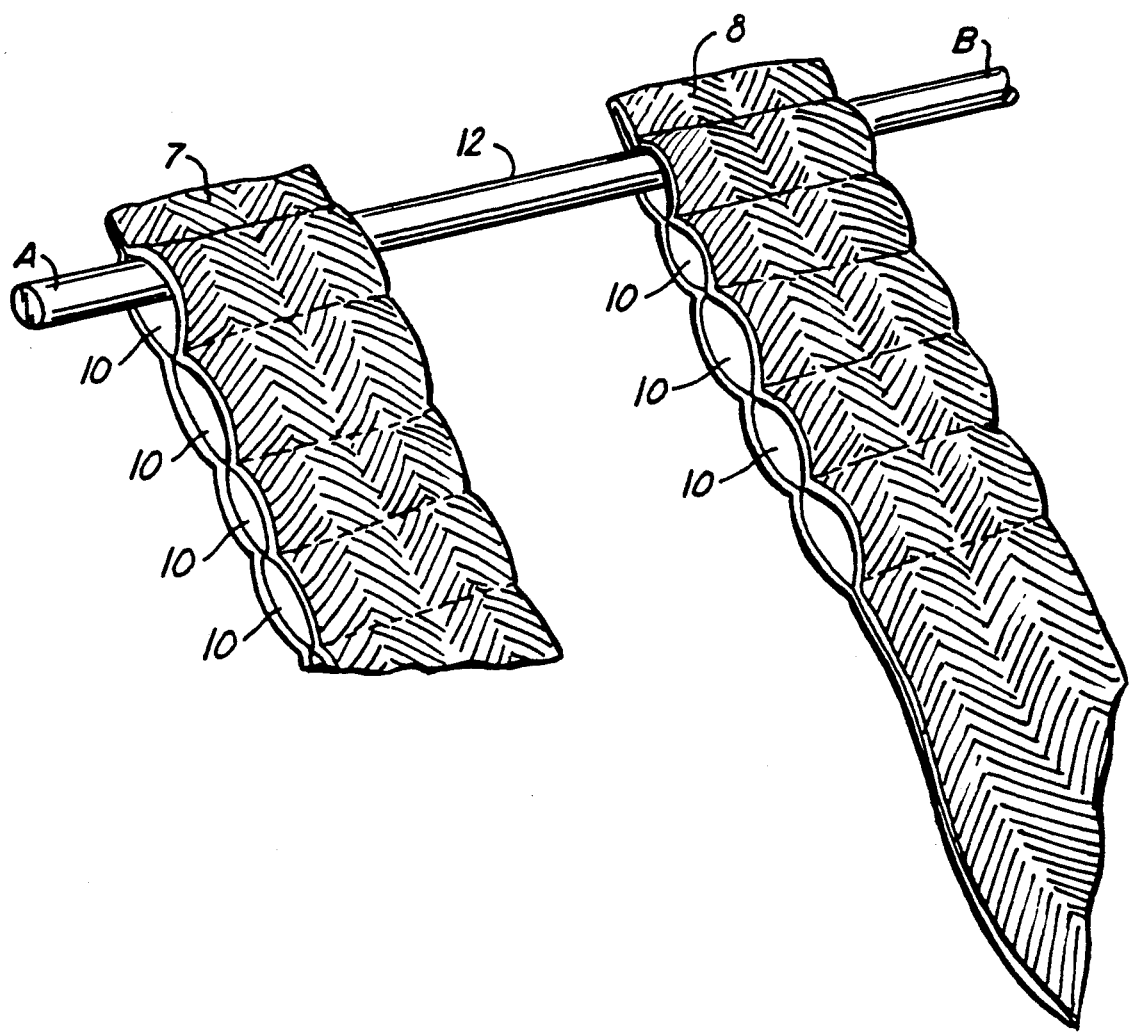
FIG_2.

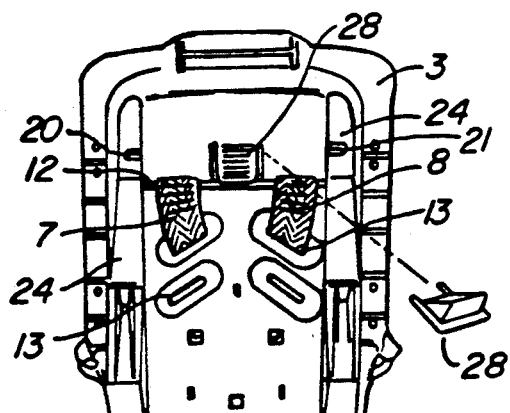
FIG._3a.
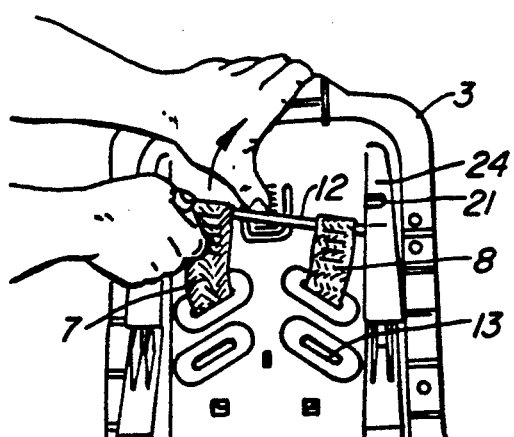
FIG._3b.
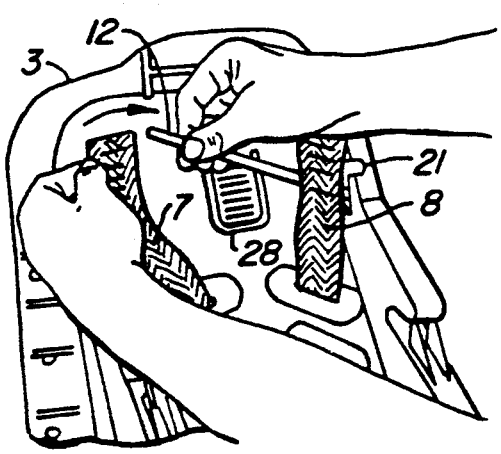
FIG._3c.
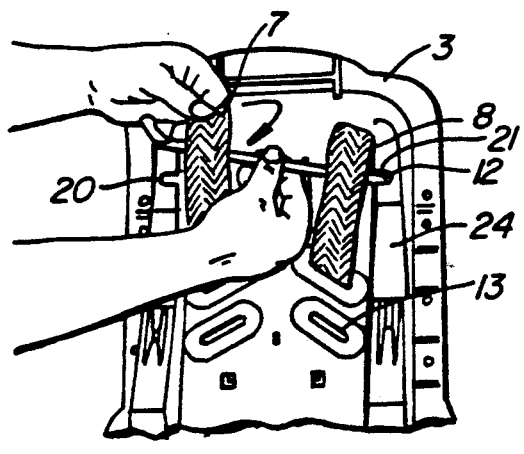
FIG._3d.
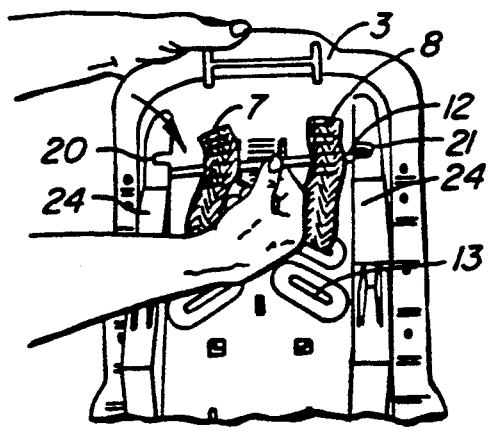
FIG._3e.
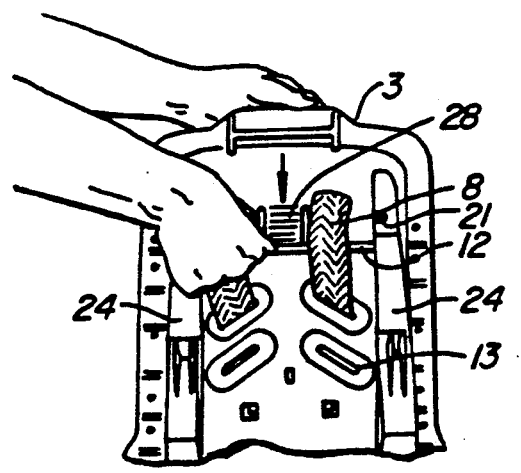
FIG._3f.

HARNESS ADJUSTMENT MECHANISM

This is a continuation of application Ser. No. 07/556,070, filed July 20, 1990, now abandoned.

BACKGROUND OF THE INVENTION

The present invention relates to a child's car seat and more particularly to an improvement in the restraining system used with such seats. Car seats greatly reduce the risk of injury or death to children when automobile accidents occur. The typical car seat consists of a five-point restraining harness which anchors to either a tubular frame or a unitary plastic seat in which the child is enclosed.

An inherent problem with car seat restraining harnesses is the difficulty encountered in properly adjusting the harness. An improperly adjusted harness may potentially negate the safety benefits of the restraint device and may also cause injury to the child. A child in an improperly secured harness may have a tendency to slip sideways within the harness. Furthermore, the harness may rope or twist, turning the harness into a cutting edge. Also, a harness which is too loose will permit the child to slip down and forward in the direction of his/her knees and legs.

A complicated adjustment is more difficult to secure properly since the potential for mistakes increases. In addition, the more numerous and complicated the required adjustments, the more daunting and frustrating the adjustment task. These conditions increase the likelihood that the person placing the child in the restraint will grow lax in properly securing the harness. These problems are further compounded by the fact that children of car seat age also grow rapidly, necessitating frequent harness readjustments.

SUMMARY OF THE INVENTION

The present invention provides a fast and foolproof harness adjustment and fastening method which is unlikely to be improperly threaded, and is quick and easy to adjust. A child placed in a car seat incorporating the present invention is therefore more likely secured by a properly adjusted harness.

According to one embodiment of the invention, a restraint harness is fabricated as a single strap, or belt. The center of the belt is anchored at a single point, traverses through a sliding bit through a slot in a buckle, to the plastic housing in which the child sits. The two free ends of the harness straps pass over the child's shoulders and are threaded through the back portion of the plastic housing. The harness straps contain a series of loops through which a wire bar may be threaded. Once threaded through both straps, each end of the wire bar fits into a groove located on each side of the plastic housing. A snap tab prevents the wire bar from dislodging from the grooves.

The harness size can be easily adjusted by unthreading the wire rod from the loop and rethreading the rod into another loop. No metal strap slides or other cumbersome fasteners are required to secure the harness in the proper position. The reduced complexity of the fastening system reduces the chance of errors in harness adjustment and also increases the likelihood that proper care will be taken to secure the harness. In addition, the necessary adjustment can be made with the child in or out of the car seat. This feature not only provides added convenience but aids in adjusting the harness to the proper length.

BRIEF DESCRIPTION OF THE DRAWINGS

FIG. 1 shows an isometric drawing of a child safety seat according to an embodiment of the present invention;

FIG. 2 shows harness belt fabricated according to an embodiment of the invention; and FIG. 3 shows securing and readjusting of the harness belt according to an embodiment of the present invention.

DESCRIPTION OF THE PREFERRED EMBODIMENT

FIG. 1 shows a child's car seat incorporating an embodiment of the present invention. The seat 2 comprises a unitary plastic cast structure 3 which semi-encloses the child. The seat is designed to be rear facing and can hold a child of up to 18 pounds. A harness 4 is used to secure the child within seat 2.

Harness 4 is fabricated as a single belt which is threaded through a buckle 5. Buckle 5 is fastened to a metal tongue (not shown). The metal tongue is rivited to frame 3 and anchors buckle 5 to the plastic frame 3 at point 6. This portion of the harness restrains the child in the crotch area and prevents the child from slipping out of seat 2. Buckle 5 may be detached from frame 3 to free harness 4 and insert or remove the child from seat 2. The two free ends of harness 4 form shoulder straps 7 and 8. Straps 7 and 8 pass over the child's shoulders and through a back portion of seat 2 where they are secured to frame 3. The child's upper and lower body are now secured within seat 2.

Harness 4 must be adjusted in length to accommodate children of different sizes. FIG. 2 shows a harness constructed according to an embodiment of the present invention. Shoulder straps 7 and 8 each contain a series of loops 10 which extend across the width of the belt and are equally spaced along its length. A wire rod 12 passes through loops 10 and is used to secure the ends of harness 4 to frame 3. Because harness 4 is a single piece, the harness 4 moves freely through buckle 5. The length of harness 4 necessary to restrain the child can thus be controlled by pulling harness 4 through buckle 5 and selectively threading wire rod 12 through various loops 10. In this manner, the harness can be easily and quickly adjusted to accommodate changes in the size of the child without the need for metal strap slides or other devices which are difficult to manipulate.

Loops 10 are formed by folding the ends of the harness belt material over onto itself and stitching in a series of seams to form loops of consistent spacing and size. Loops 10 must be sized to accept wire rod 12, yet not be so large that rod 12 slides within the loop in a direction parallel to the length of the belt. Loops 10 must also be of sturdy construction to prevent rupture of the loop from repeated threading. In addition, loops 10 must be constructed to resist forces imparted to the harness, and thus to the belt/rod interface, from motion of the child both in routine use and in the event of an automobile accident.

Similarly, rod 12 must resist bending and should remain consistently the same shape throughout repeated manipulations and in the event of an accident. If rod 12 were to change shape, the effective length of rod 12 would decrease, and the rod might not fit securely into frame 3. Rod 12 is manufactured as a plain steel rod.

FIG. 3 shows adjustment and reattachment of harness 4 according to the present invention as viewed from the rear of seat 2. Locating the harness fastening and adjustment mechanisms at the rear of seat 2 keeps the mechanisms safely out of reach of the child. In FIG. 3a, straps 7 and 8 pass from the front portion of seat 2, through eyelets 13 and are secured to frame 3. Rod 12 is threaded through both belts and the ends 12a and 12b of rod 12 fitted into grooves 20 and 21 located on edges 24 of frame 3. A snap tab 28, molded integrally to plastic frame 3, prevents upward travel of rod 12 once inserted into grooves 20 and 21.

To adjust the length of harness 4, straps 7 and 8 must first be unfastened. Holding down snap tab 28 allows wire rod 12 to slide up grooves 20 and 21 as shown in FIG. 3b. End 12b of rod 12 remains pivotally secured to frame 3 and cannot be completely removed from groove 21. End 12a of rod 12 may be lifted up and out of groove 20 as shown in FIG. 3c. Grooves 20 and 21 are canted at a slight angle from vertical. The cantation allows straps 7 and 8 to drape across the child's shoulders at a slight angle. This feature makes the harness more comfortable for the child. The diameter of rod 12 determines the width of the grooves. The groove width should be sufficient to permit rod 12 to slide up and down within the groove, but should not allow rod 12 to be easily dislodged from the groove.

Once end 12a is free of groove 20, straps 7 and 8 may be slipped off of rod 12. To adjust the harness, rod 12 must simply be threaded into another of loops 10. To make small adjustments, harness 4 is pulled through buckle 5 to the desired length and rod 12 is inserted into a different loop 10 on shoulder strap 7. See FIG. 3d. To make larger adjustments, both straps 7 and 8 are removed from rod 12. Rod 12 is then inserted in a different loop on both straps 7 and 8. Threading rod 12 through a loop located nearer the ends of straps 7 and 8 will increase harness size and accommodate a larger child. Conversely, threading rod 12 through a loop nearer buckle 5 of the harness will shorten harness 4 to accommodate a smaller child. Harness adjustments can be made with the child both in and out of seat 2.

Once rod 12 is threaded through the desired loops, rod 12 is returned to the grooves in the manner shown in FIG. 3e. The rod then slides down grooves 20 and 21 past snap tab 28 and the harness adjustment mechanism is locked in place as seen in FIG. 3f.

Because the child can be placed in or removed from seat 2 by fastening or unfastening buckle 5, the harness adjustment mechanism need not be tampered with once set. In addition, the harness adjustment mechanism avoids the use of metal strap slides and harness 4 cannot slip or be improperly threaded. Therefore, once set, harness 4 remains securely adjusted.

The harness adjustment and fastening apparatus of the present invention thus provides a fast and foolproof way to secure a child within a car seat. No time-consuming and laborious adjustment of metal strap slides need take place to change the size of the harness and provide a proper fit. Parents and guardians are therefore more likely to take the time to properly adjust the harness and, furthermore, the harness adjustment is more likely to be done correctly. The harness of the present invention thereby improves the safety of children riding in car seats. The preferred embodiment of the present invention has now been described. Variations and modifications will now be apparent to those skilled in the art. The scope of the invention should therefore be interpreted in light of the claims.

What is claimed is:

1. In a child's car seat including a unitary seat and back structure, an improved restraining apparatus comprising:
   a harness, formed from a single belt having a middle portion and two ends;
   a buckle through which said belt is threaded;
   said unitary structure having a means for permitting the ends of said belt to pass from a front, seat portion of said portion of said unitary seat and back structure to a back portion of said unitary seat and back structure;
   said buckle detachably secured to said front, seat, portion of said unitary seat and back structure wherein when said buckle is secured to unitary seat and back structure the middle portion of said belt is secured to said unitary seat and back structure;
   each of said harness ends having a plurality of loops;
   a wire rod, having a first end and a second end, capable of being threaded through said loops;
   a first groove located on said back portion of said unitary structure into which said first end of said rod is inserted;
   a second groove, located on said back portion of said unitary structure and spaced a given distance from said first groove, into which said second end of said rod is pivotally secured;
   a snap tab having two operative positions wherein said first operative position inhibits motion of said rod out of said first and second grooves and said second operative position permits at least said first end of said rod to be removed from said groove; and
   wherein when said rod is threaded through said loops on each of said belt ends and said snap tab is in said first operative position, said belt ends are secured to said unitary seat and back structure.

2. In a child's car seat including a unitary seat and back structure, an improved restraining apparatus comprising:
   a harness formed from a single belt having a middle portion and two ends;
   each belt end containing at least one loop;
   a rod, having two ends, which is threaded through said loops;
   a first groove, located in said unitary seat structure, adapted to receive said first end of said rod;
   a second groove, located in said unitary seat structure at a given distance from said groove, and adapted to receive said second end of said rod;
   a snap tab molded into said unitary housing wherein said snap tab prevents said first rod end from exiting said first groove and said second rod end from exiting said second groove; and
   means for securing said middle portion of said belt to said unitary seat structure.

3. In a child's car seat including a unitary seat, side and back structure, an adjustable restraining system comprising:
   a harness formed from a single belt having a middle portion and a first and a second end;
   said first belt end containing at least one loop;
   said second belt end containing at least two loops;

a rod, having a first and a second end, which is threaded through a given loop on said first belt end and a selected loop on said second belt end;

a first groove, located in said unitary seat structure, and having a major axis substantially parallel to the back and side structure and substantially perpendicular to the seat and adapted to receive said first end of said rod;

a second groove, located in said unitary seat structure at a given distance from and facing said first groove, and adapted to receive said second end of said rod, wherein a major axis of said second groove is substantially parallel to the back and side structures and substantially perpendicular to the seat; and means for securing said middle portion of said belt to said unitary seat structure.

4. The restraining apparatus of claim 3 further comprising a means for preventing said rod from exiting said groove.

5. The adjustable restraining system of claim 3 wherein said first and said second grooves are channels.

6. The restraining apparatus of claim 3 further comprising a means for enabling removal of said rod ends from said first and second grooves.

7. The invention of claim 3 wherein said means for securing said middle portion of said belt comprises:
a buckle through which said harness is threaded;
said buckle anchored to said unitary housing.

8. The invention of claim 7 wherein said buckle is detachably anchored to said unitary housing.

9. A method for adjusting a harness, having at least two shoulder straps, on a child car seat having a back, sides and a seat, comprising the steps of:

threading a wire rod, having a first and second end, through a loop contained in each one of said harness shoulder straps;

sliding said first end of said wire rod into a first channel located on said car seat, wherein a major axis of said first channel is substantially parallel to the back and sides and substantially perpendicular to the seat of the child car seat;

sliding said second end of said wire rod into a second channel located on said car seat and facing said first channel, wherein a major axis of said second channel is substantially parallel to the back and sides and substantially perpendicular to the seat of the child car seat; and securing said wire rod ends within said first and second grooves to maintain said wire rod in a substantially perpendicular orientation to said major axes of said channels once said first and second ends of said wire rod have been slid into said first and second channels.

10. A method for adjusting a harness, having at least two shoulder straps, on a child car seat having a back, a seat, and side portions, comprising:

threading a wire rod, having a first and second end, through a loop contained in each one of said harness shoulder straps;

sliding said first end of said wire rod into a first groove located on said car seat, wherein a major axis of said first groove is substantially parallel to the back and side portions of the car seat and substantially perpendicular to the seat of the car seat;

sliding said second end of said wire rod into a second groove located on said car seat facing said first groove, wherein a major axis of said second groove is substantially parallel to the back and side portions of the car seat and substantially perpendicular to the seat of the car seat; and securing said wire rod ends within said first and second grooves to maintain said wire rod in a substantially perpendicular orientation to said major axes of said grooves once said first and second ends of said wire rod have been slid into said first and second grooves.

11. The method for adjusting a harness of claim 10 further comprising:
removing at least one of said first and second ends of said wire rod from at least one of said grooves.

* * * * *